(12) United States Patent
Wojsiat (10) Patent No.: US 12,420,865 B2
(45) Date of Patent: Sep. 23, 2025

(54) ARTICULATED WORKING MACHINE VEHICLE

(71) Applicant: Volvo Construction Equipment AB, Eskilstuna (SE)

(72) Inventor: Jacek Wojsiat, Dobrzykowice (PL)

(73) Assignee: Volvo Construction Equipment AB, Eskilstuna (SE)

( * ) Notice: Subject to any disclaimer, the term of this patent is extended or adjusted under 35 U.S.C. 154(b) by 667 days.

(21) Appl. No.: 17/759,580

(22) PCT Filed: Jan. 30, 2020

(86) PCT No.: PCT/EP2020/052236
§ 371 (c)(1),
(2) Date: Jul. 27, 2022

(87) PCT Pub. No.: WO2021/151488
PCT Pub. Date: Aug. 5, 2021

(65) Prior Publication Data
US 2023/0060686 A1   Mar. 2, 2023

(51) Int. Cl.
*B62D 12/00* (2006.01)
*B62D 53/00* (2006.01)

(52) U.S. Cl.
CPC ........... *B62D 12/00* (2013.01); *B62D 53/005* (2013.01)

(58) Field of Classification Search
CPC ................................. B62D 12/00; B62D 12/02
See application file for complete search history.

(56) References Cited

U.S. PATENT DOCUMENTS

| | | | |
|---|---|---|---|
| 3,035,654 A | 5/1962 | Nuttall, Jr. et al. | |
| 4,147,375 A | 4/1979 | Bangert et al. | |
| 4,353,572 A | 10/1982 | McCain | |
| 5,400,878 A | 3/1995 | D'Anna et al. | |
| 2013/0277942 A1 | 10/2013 | Christensen et al. | |
| 2018/0170369 A1* | 6/2018 | Mitchell | B62D 1/02 |

FOREIGN PATENT DOCUMENTS

| | | |
|---|---|---|
| CN | 102356017 A | 2/2012 |
| CN | 103608242 A | 2/2014 |
| CN | 104108420 A | 10/2014 |

(Continued)

OTHER PUBLICATIONS

European Office Action dated Aug. 24, 2023 in corresponding European Patent Application No. 20704202.9, 52 pages.

(Continued)

*Primary Examiner* — Kevin Hurley
(74) *Attorney, Agent, or Firm* — Venable LLP; Jeffri A. Kaminski (57) ABSTRACT

An articulated working machine vehicle, such as an articulated hauler, including a front section and a rear section pivotally connected via a connection arrangement configured to control a pivot angle between the front and rear sections for steering of the vehicle, the connection arrangement further being configured to allow the front and rear sections to rotate in relation to each other about a longitudinal axis of the vehicle. The connection arrangement comprises a rotation damper device arranged to transfer dampened relative rotation between the front section and the rear section of the vehicle.

12 Claims, 10 Drawing Sheets

(56) References Cited

FOREIGN PATENT DOCUMENTS

| | | |
|---|---|---|
| CN | 104349966 A | 2/2015 |
| CN | 107972483 A | 5/2018 |
| CN | 108216364 A | 6/2018 |
| CN | 109982915 A | 7/2019 |
| DE | 2658932 A1 | 6/1978 |
| DE | 3817031 A1 * | 11/1989 |
| DE | 10029691 A1 | 1/2002 |
| DE | 502007005832 | 1/2011 |
| EP | 1164074 A2 | 12/2001 |
| EP | 1975045 A1 | 10/2008 |
| EP | 2218835 B1 | 10/2012 |
| FR | 2663590 A1 | 12/1991 |
| GB | 368744 A | 3/1932 |
| WO | 2015094025 A1 | 6/2015 |

OTHER PUBLICATIONS

Chinese Office Action dated Nov. 20, 2023 in corresponding Chinese Patent Application No. 202080094375.2, 7 pages.
International Search Report and Written Opinion in corresponding International Application No. PCT/EP2020/052236 mailed Oct. 1, 2020 (19 pages).
China National Intellectual Property Administration Notification on Grant of Patent Right and the Notification for Patent Registration Formalities dated Apr. 4, 2024 in corresponding Chinese Patent Application No. 202080094375.2.

* cited by examiner

ARTICULATED WORKING MACHINE VEHICLE

CROSS-REFERENCE TO RELATED APPLICATIONS

This application is a U.S. National Stage application of PCT/EP2020/052236, filed Jan. 30, 2020 and published on Aug. 5, 2021, as WO 2021/151488, all of which is hereby incorporated by reference in its entirety.

TECHNICAL FIELD

The invention relates to an articulated working machine vehicle, such as an articulated hauler, comprising a vehicle front section and a vehicle rear section pivotally connected via a connection arrangement configured to control a pivot angle between the front and rear sections for steering of the vehicle, the connection arrangement further being configured to allow the front and rear sections to rotate in relation to each other about a longitudinal axis of the vehicle.

Although the invention will be described with respect to an articulated hauler it is not restricted to this particular vehicle but may also be used in other articulated vehicles.

BACKGROUND

Articulated working machine vehicles of the above type are often used on bumpy roads causing the vehicle front section (pull unit, tractor, etc.) and the vehicle rear section (load unit, trailer, etc.) to rotate significantly in relation to each other about a rotational axis extending longitudinally along the vehicle through the connection arrangement that connects the front and rear sections. Such rotation creates strong forces onto an operator/driver of the vehicle, who normally is located in a cab on the front section at a significant distance above the rotational axis/the connection arrangement and thus will be forced from side to side while driving on such roads.

WO2015/094025A1 discloses an articulated working machine vehicle where the connection arrangement that connects the front and rear vehicle portions is provided with an active torque generator adapted to selectively impart a torque about the geometrical axis of rotation between the front and rear vehicle portions. The active torque generator comprises e.g. an electric motor and appears to be directed to provide a torque onto a shaft of the first or second vehicle portions for reducing a difference in wheel normal force between left and right sides of the vehicle when positioned sideways on a slope.

A purpose of the present invention is to increase the comfort of the operator while driving an articulated working machine vehicle on bumpy roads.

SUMMARY

The invention relates to an articulated working machine vehicle, such as an articulated hauler, comprising a front section and a rear section pivotally connected via a connection arrangement configured to control a pivot angle between the front and rear sections for steering of the vehicle, the connection arrangement further being configured to allow the front and rear sections to rotate in relation to each other about a longitudinal axis of the vehicle. Further, the connection arrangement comprises a rotation damper device arranged to transfer dampened relative rotation between the front section and the rear section of the vehicle.

Conventionally, the front and rear vehicle sections can in principal rotate freely in relation to each other, i.e. the relative rotation is not transferred at all. This means that a driver of the vehicle is exposed to sudden change of rotational speed, especially if a wheel on one side of the front section (i.e. the section provided with the driver's cab) loses support or if the rotation change direction, such as if the front section tilts towards one side to the limit and then rotates back. Further, with free rotation either vehicle section can gain rotational speed (and consequently kinetic energy) which can lead to roll over.

If the connection arrangement would be rotationally locked so that relative rotation between the front and rear vehicle sections would be prevented, any rotation would be transferred between the two sections. This would lead to a stiff vehicle not very well adapted to bumpy roads. The articulated vehicle according to this disclosure may be regarded as something in-between free rotation and locked rotation (where relative rotation is prevented); the rotation is indeed transferred between the two vehicle sections as with locked rotation but it is transferred in a dampened manner so that relative rotation is allowed, which it is not with locked rotation, and so that the relative rotation, or at least the rate of change of the relative rotation, becomes reduced compared to free rotation.

An advantage of an articulated working machine of the inventive type is thus that the relative rotation is dampened, or rather the rate of change, i.e. the acceleration, of the relative rotation is dampened. This improves driver comfort, and it also increases safety (reduces risk of roll over) as also the rotation speed and energy is lowered.

A particular example where a dampened relative rotation is advantageous is when there is a deep hole on one side of the road. When a wheel of either the front or rear vehicle section reaches the hole the wheel will rapidly move downwards into the hole (and the suspension/shock absorber of that wheel will collapse to a certain degree). However, because of the rotation damper device the vehicle section in question will not rotate and tilt as rapidly as the wheel goes down into the whole. Besides improving driver's comfort, in the case where the front vehicle section reaches the hole, this could prevent roll over for the vehicle section concerned if the hole is deep enough to be critical for roll over.

Compared to WO2015/094025A1 the above vehicle design differs in that rotation damping is provided, no active torque is generated. The effects and advantages described above are thus not achieved by the vehicle of WO2015/094025A1. Further, the rotation damping device is preferably a passive system that can be made more simple, cost-effective and reliable compared to the active system of WO2015/094025A1.

In an embodiment the rotation damper device comprises a first part fixed to the vehicle front section and a second part fixed to the vehicle rear section so that the first part rotates in relation to the second part when the front and rear vehicle sections rotate in relation to each other about the longitudinal axis of the vehicle, wherein the rotation damper device further comprises a viscous liquid arranged between and in connection with the first and a second part so as to provide for a dampened transfer of rotation between the first and second parts.

The first and second parts of the rotation damper device are thus connected via a viscous fluid that dampens the transfer of a rotational movement between the two parts. For instance, if the first part suddenly starts to rotate while the second part is stationary, the viscous liquid will slow down the rate of change of the rotation of the first part while at the same time start rotating the second part but at a lower rate of change than the first part.

The viscous fluid may be based on silicon. The damping moment depends on the viscosity of the fluid and the distance/gap between the first and second parts of the rotation damper. Different viscosities and/or gaps may thus be used to adapt the rotation damper device to a particular application.

In an embodiment the first and second parts of the rotation damper device are arranged concentrically and wherein the viscous liquid is arranged radially in between the first and second parts. This provides for an efficient damper device both with regard to function and space required.

In an embodiment at least one of the first and second parts of the rotation damper device is connected to its corresponding vehicle section via a driving connection, such as a driving belt. Thus, the first or second part of the rotation damper device may be indirectly connected via the driving connection to its corresponding vehicle section. The damper device may thereby be arranged at a side of the connection arrangement, which may be suitable if there is no room in/at the connection arrangement or if it is inconvenient or difficult to modify the connection arrangement so as to integrate a damper device.

In an embodiment the connection arrangement comprises a first connection element fixed to the front vehicle section and a second connection element fixed to the rear vehicle section, wherein the first connection element is arranged to be rotatable inside the second connection element and wherein the rotation damper device is arranged in association with a rear end portion of the first connection element. This is a suitable position for the rotation damper device in many articulated working machine vehicles. Preferably, the first part of the rotation damper device is connected to the first connection element.

In an embodiment the longitudinal axis, about which the connection arrangement allows the front and rear sections to rotate in relation to each other, extends through the connection arrangement.

In an embodiment the rotation damper device is arranged concentrically around the longitudinal axis about which the connection arrangement allows the front and rear sections to rotate in relation to each other. A rotation damper device integrated into the connection arrangement may be arranged in this way.

In an embodiment the rotation damper device comprises a locking member arranged to lock the second part of the rotation damper device to the rear vehicle section. Such a locking member is useful when it for some reason is an advantage to not fix or lock the second part directly to the rear vehicle section. One reason may be that it is difficult to lock the second part directly. Another reason may be that it is desired to have the possibility to deactivate the rotation damping device so as to allow free relative rotation between the front and rear vehicle sections. In such a case the locking member is preferably adapted to be easy to unlock so that the second part can rotate freely in relation to the rear vehicle section.

In an embodiment the locking member is fixed to the rear vehicle section, wherein the locking member is provided with clamping elements arranged to fix a flange of the second part of the rotation damper device located between the clamping elements. This provides for a locking member that can be unlocked (by releasing the clamping elements) so as to allow free rotation of the second part of the rotation damper device.

In an embodiment the vehicle front section is provided with an operator/driver cab. Although the advantages related to operator comfort would not be relevant, the use of the rotation damper device is useful also for an autonomous vehicle (to avoid roll over) that not necessarily need be provided with an operator cab.

In an embodiment the vehicle rear section is provided with a load container.

In an embodiment each of the vehicle front and rear sections is provided with at least one pair of wheels.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Example embodiments of the invention will now be described with reference to FIGS. 1-11.

Figure 1:
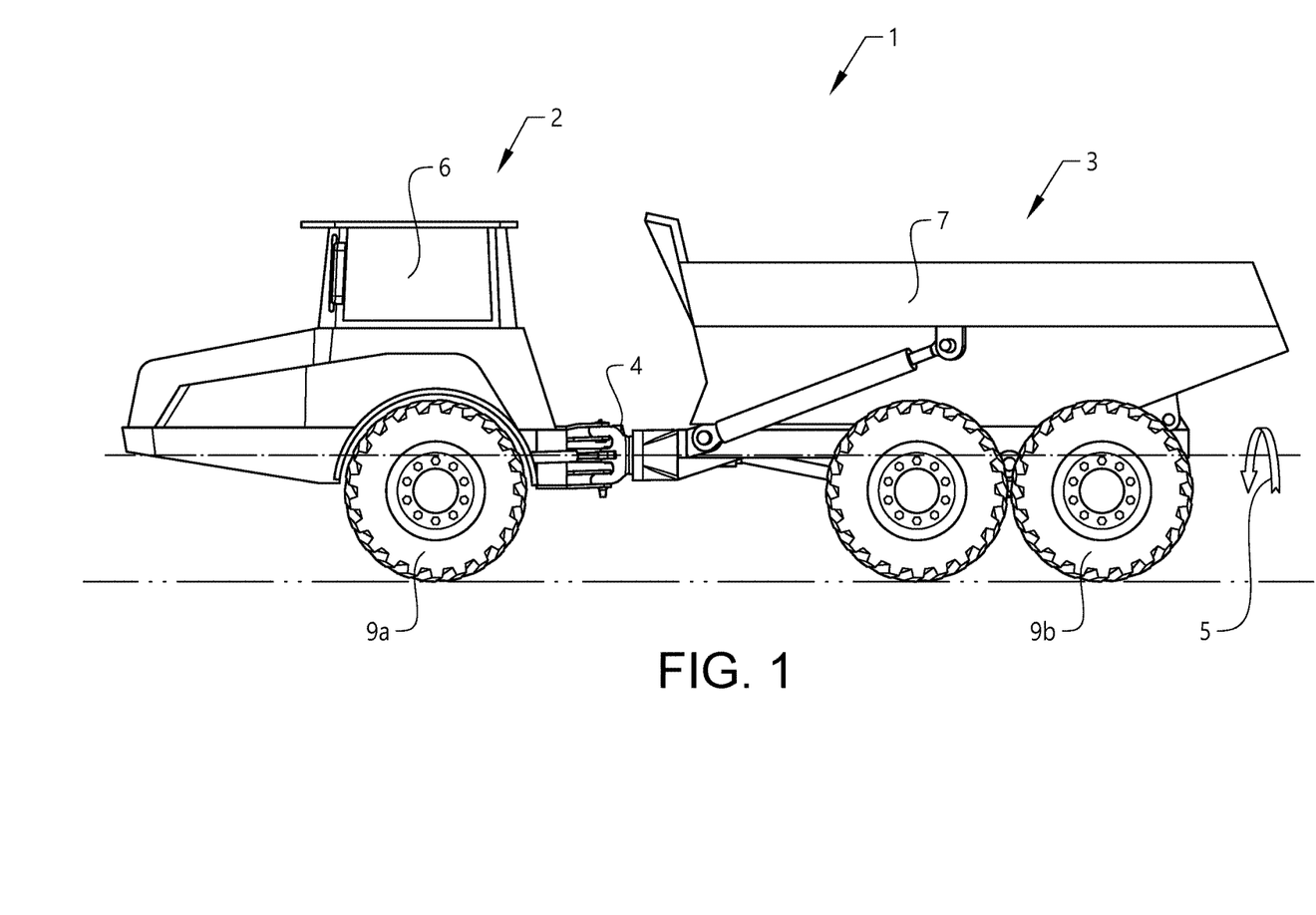
FIG. 1 shows an articulated hauler provided with a rotation damper device according to this disclosure.

FIG. 1 shows an articulated working machine vehicle in the form of an articulated hauler 1 comprising a front section 2 and a rear section 3 pivotally connected via a connection arrangement 4 configured to control a pivot angle between the front and rear sections 2, 3 for steering of the vehicle 1. The connection arrangement 4 is further configured to allow the front and rear sections 2, 3 to rotate in relation to each other about a longitudinal axis 5 of the vehicle 1. As will be further described below, the connection arrangement 4 is provided with a rotation damper device 10, 100 arranged to transfer dampened relative rotation between the front section 2 and the rear section 3 of the vehicle 1.

As further shown in FIG. 1, the front section 2 is provided with an operator/driver cab 6 and the vehicle rear section 3 is provided with a load container 7. Further, each of the vehicle front and rear sections 2, 3 is provided with at least one pair of wheels 9a, 9b.

Figure 2:
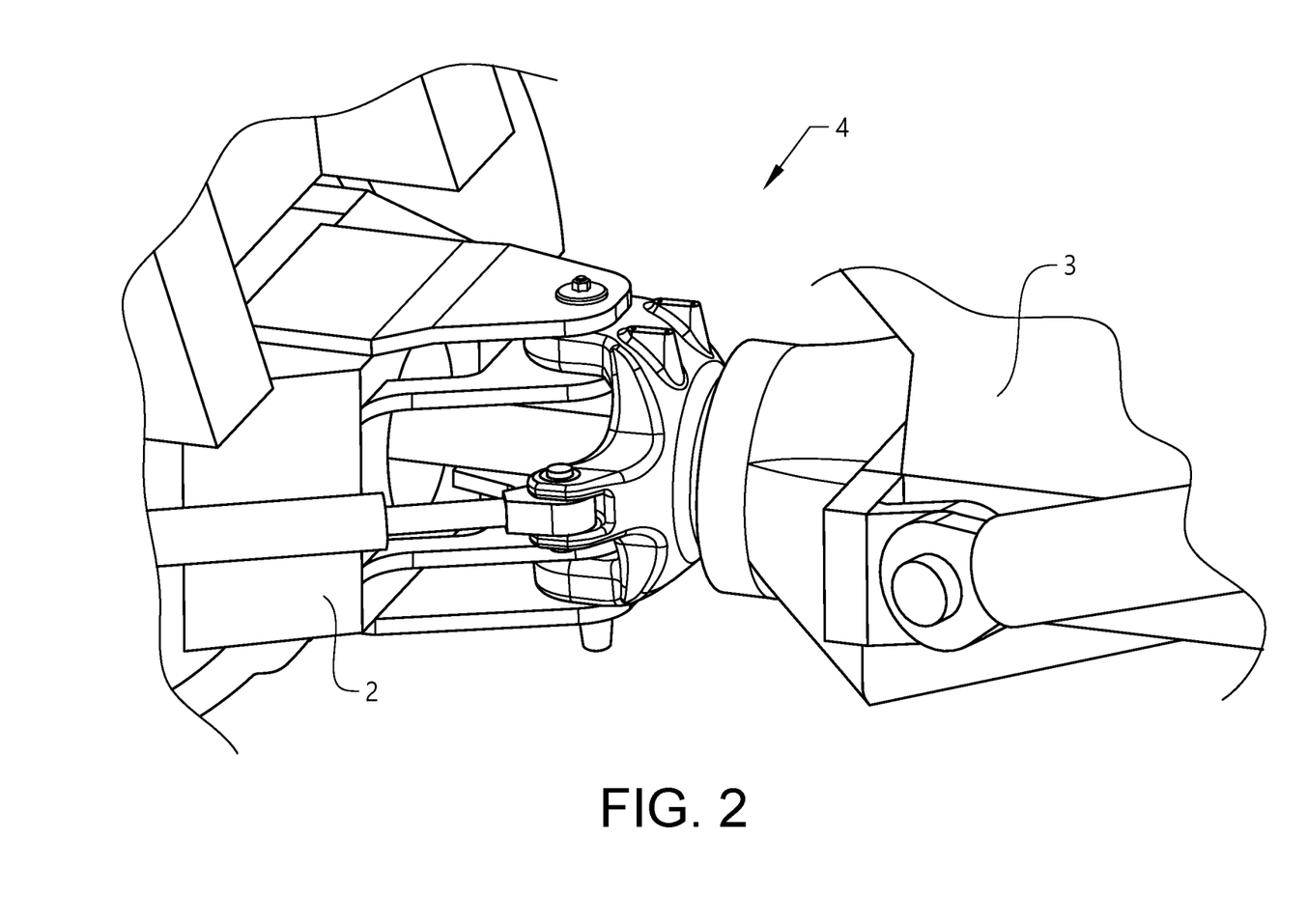
FIG. 2 shows a magnification of a connection arrangement of the articulated hauler of FIG. 1.
Figure 3:
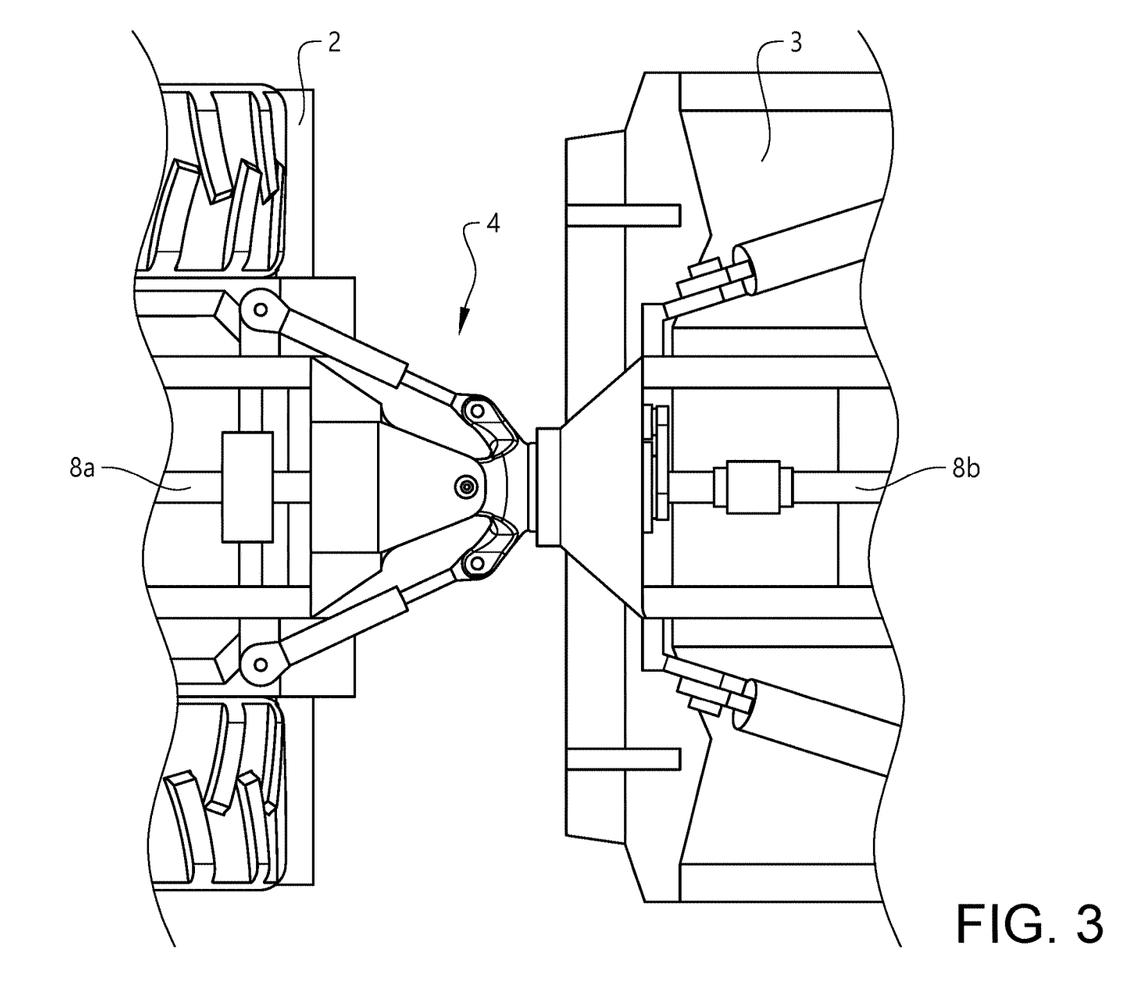
FIG. 3 shows a view from below of the connection arrangement according to FIG. 2.

FIG. 2 shows a magnification of the connection arrangement 4 of the articulated hauler 1 of FIG. 1, and FIG. 3 shows a view from below of the connection arrangement 4. As shown in FIG. 3, a drive shaft with front portion 8a and rear portion 8b for driving of the rear section wheels 9b extends along the vehicle from the front vehicle section 2 (which is provided with a power source, transmission etc., not shown) through the connection arrangement 4 and further along the rear vehicle section 3. Front and rear drive shaft portions 8a, 8b are connected inside the connection arrangement 4 so as to allow a varying pivot angle as well as relative rotation between the front and rear vehicle sections 2, 3. Such drive shaft connections are well known as such.

Figure 4:
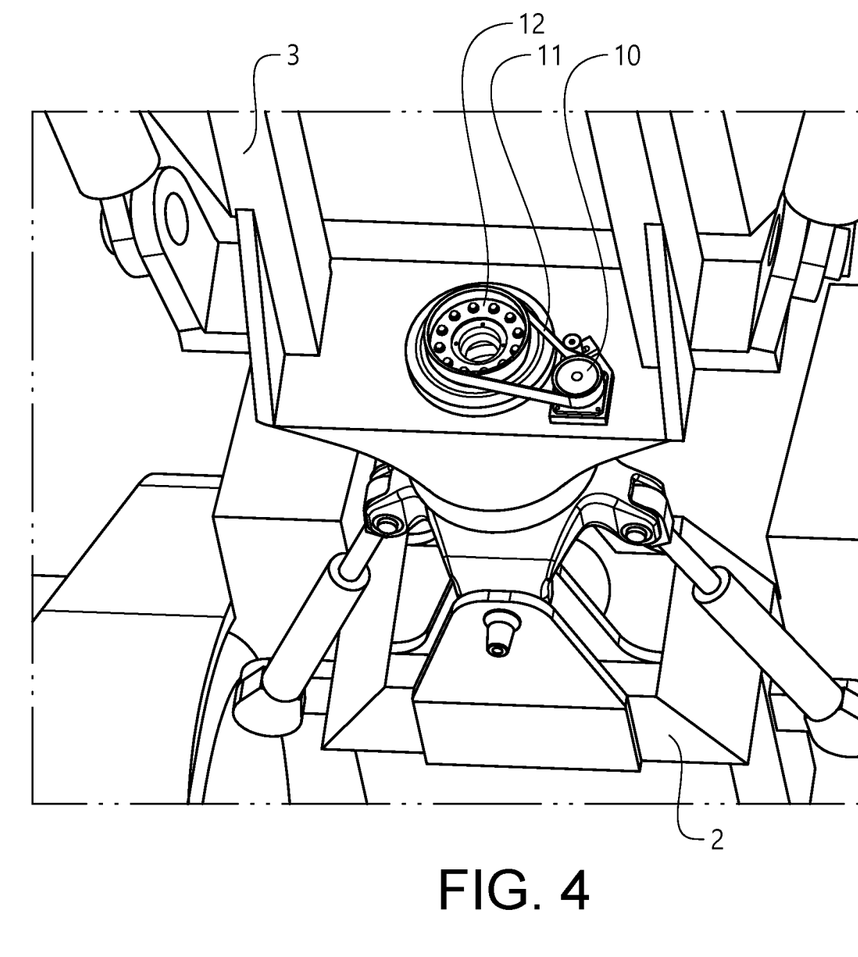
FIG. 4 shows the connection arrangement according to FIGS. 2 and 3 provided with a first embodiment of the rotation damper device.

FIG. 4 shows the connection arrangement 4 provided with a first embodiment of the rotation damper device 10. The damper device 10 is fixed to a wall section of the rear vehicle section 3. A driving belt 11 connects a rotatable part 10a of the damper device 10 (see schematic FIG. 10) with a part 12 that is fixed to the front vehicle section 2, which part 12 forms thus rotates with the front vehicle section 2. Accordingly, when the front section 2 rotates in relation to the rear section 3 the part 12 rotates the rotatable part 10a of the damper device 10 via the drive belt 11.

Figure 5:
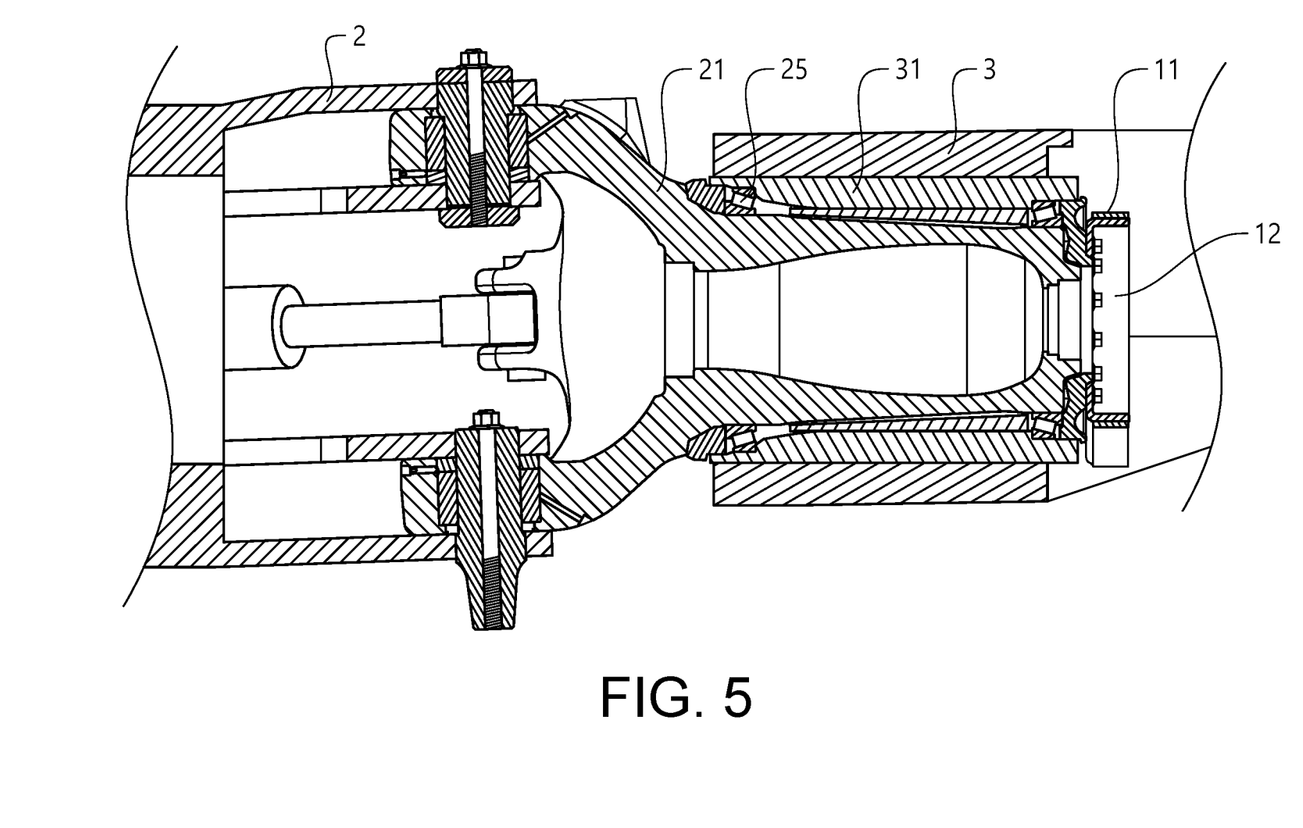
FIG. 5 shows a sectional view of the connection arrangement according to FIG. 4.

FIG. 5 shows a sectional view of the connection arrangement 4 shown in FIG. 4. As can be seen in FIG. 5, the connection arrangement 4 comprises a first connection element 21 that is fixed to the front vehicle section 2 and a second connection element 31 that is fixed to the rear vehicle section 3. The first connection element 21 is arranged to be rotatable inside the second connection element 31 by means of a set of roller bearings 25. The part 12 that is connected to the rotation damper device 10 via belt 11 forms a rear end portion of the first connection element 21. The rear portion 8b of the drive shaft is not shown in FIG. 5.

Figure 6:
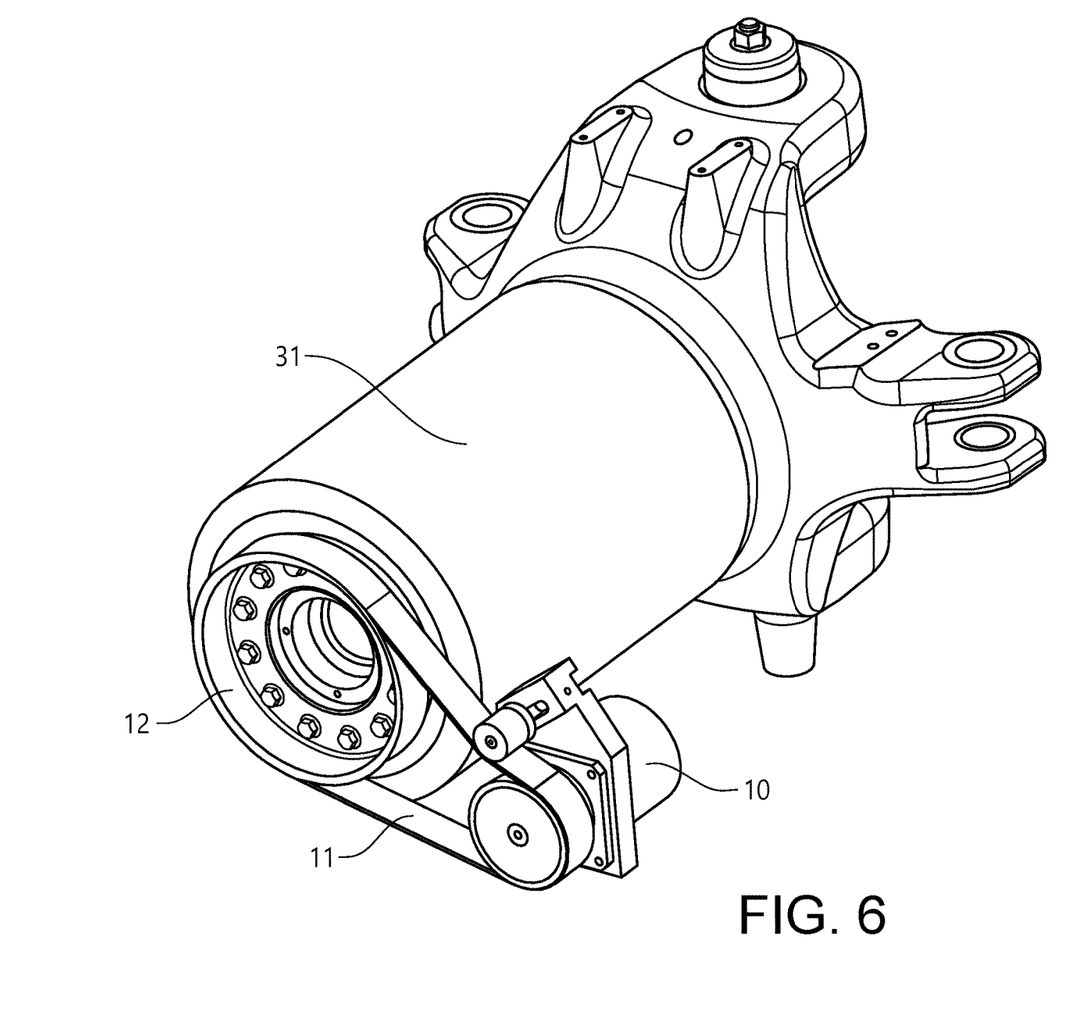
FIG. 6 shows parts of the connection arrangement according to FIG. 4.

FIG. 6 shows selected parts of the connection arrangement according to FIGS. 4 and 5, including the rotation damper device 10, the driving belt 11, the part 12 (that forms a rear end portion of the first connection element 21) and the second connection element 31 that is fixed to the rear vehicle section 3 and surrounds the first connection element 21.

Figure 7:
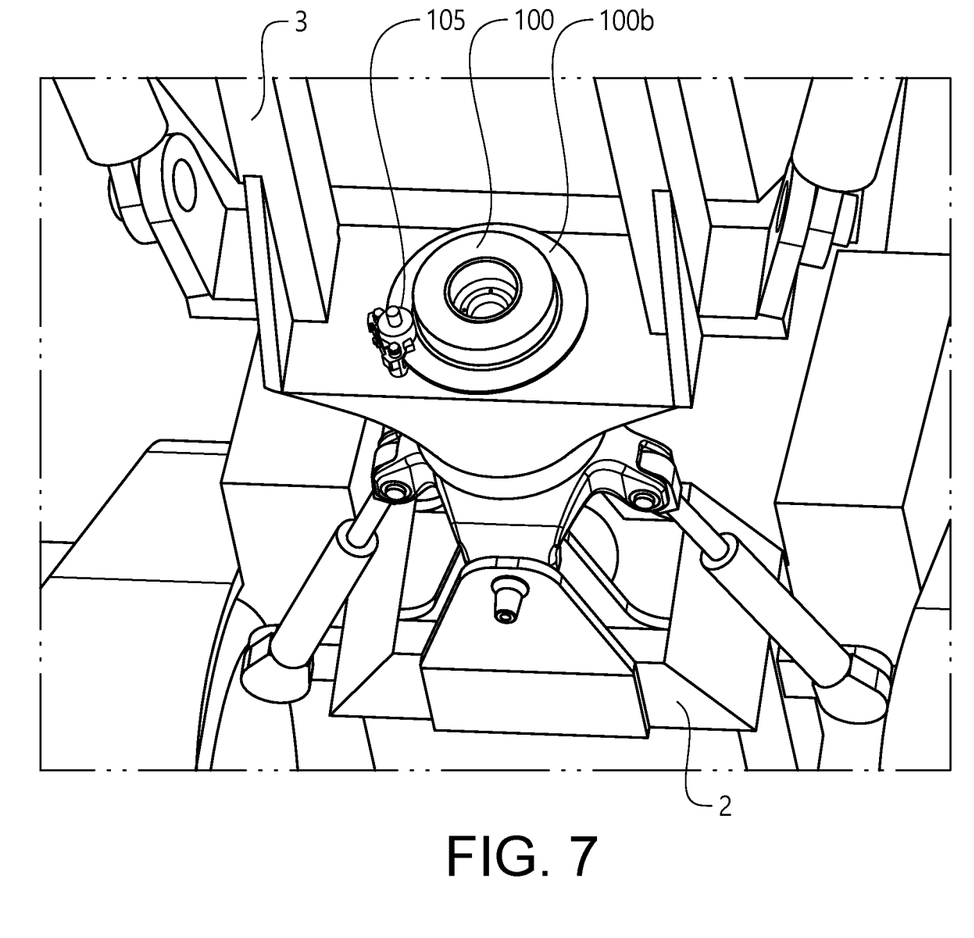
FIG. 7 shows the connection arrangement according to FIGS. 2 and 3 provided with a second embodiment of the rotation damper device.

FIG. 7 shows the connection arrangement 4 provided with a second embodiment of the rotation damper device 100. In this case the damper device 100 is more integrated into the connection arrangement 4 so that no driving belt or other driving connection is needed. A part 100b of the damper device 100 (see also schematic FIG. 11) is fixed to the rear vehicle section 3 by means of, in this example, a locking member 105 that is capable of being unlocked so as to disengage the damper device 100 and allow free rotation between the front and rear vehicle sections 2, 3. In other embodiments the part 100b may be fixed directly to the rear vehicle section 3 without any locking member 105.

Figure 8:
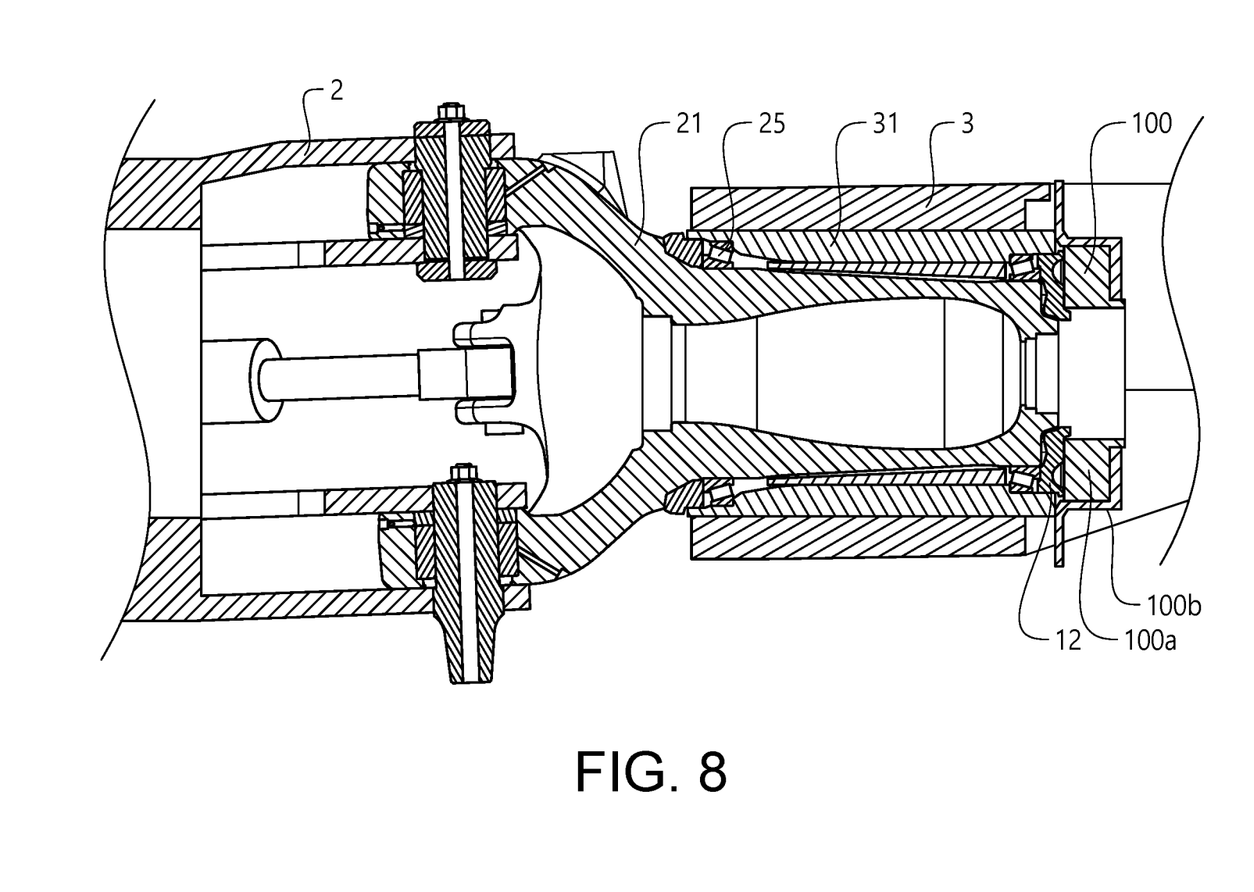
FIG. 8 shows a sectional view of the connection arrangement according to FIG. 7.

FIG. 8 shows a sectional view of the connection arrangement 4 according to FIG. 7. Also in this case (see FIG. 5), the connection arrangement 4 comprises the first connection element 21 fixed to the front vehicle section 2 and the second connection element 31 fixed to the rear vehicle section 3, wherein the first connection element 21 is arranged to be rotatable inside the second connection element 31 by means of roller bearings 25. However, the part 12 that forms a rear end portion of the first connection element 21 is in this case directly connected and fixed to a part 100a of the damper device 100, wherein the first and second parts 100a and 100b are allowed to rotate in relation to each other (see FIG. 11). The locking member 105 is not shown in FIG. 8 and, in line with FIG. 5, neither is the rear portion 8b of the drive shaft shown in FIG. 8.

Figure 9:
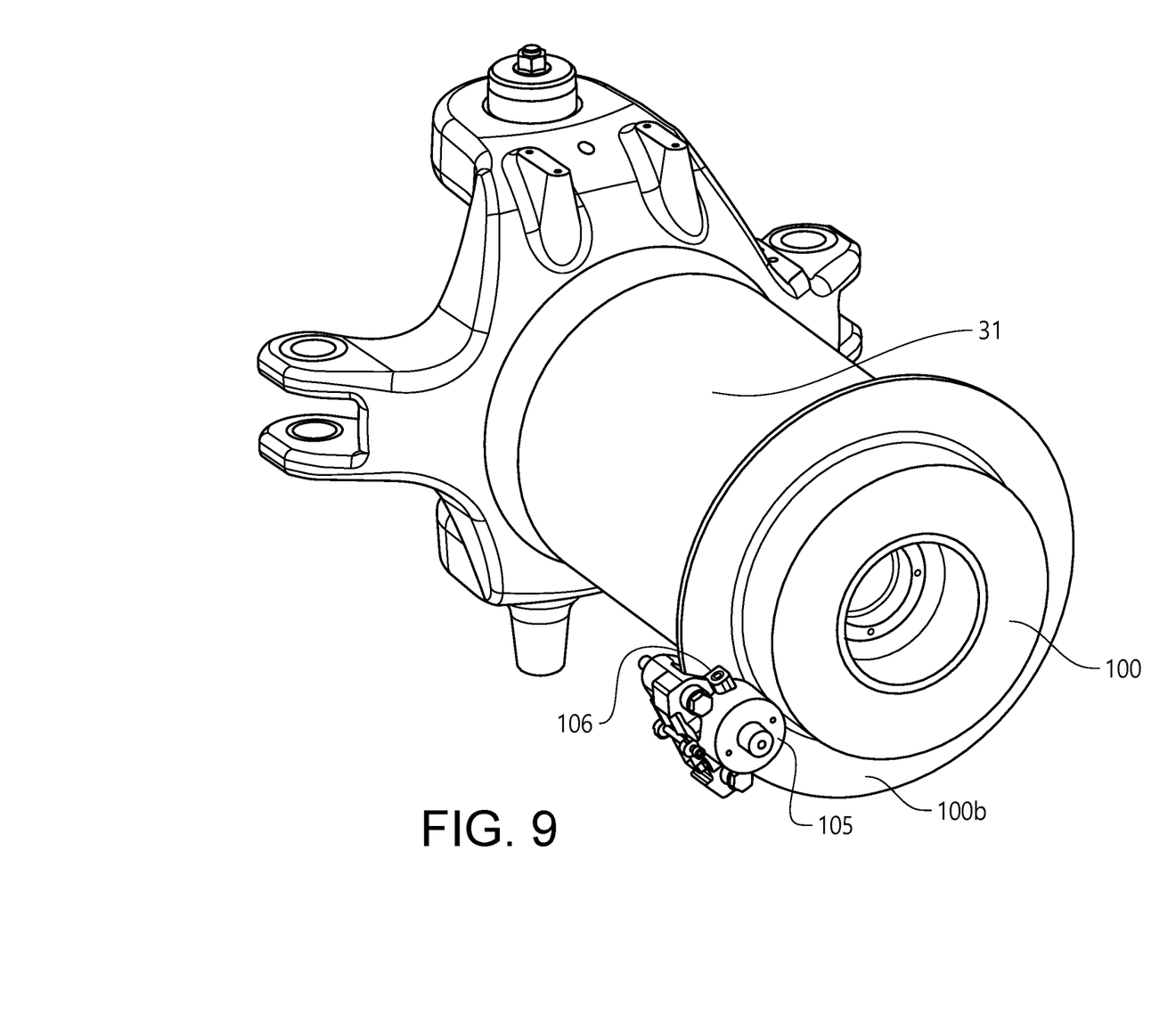
FIG. 9 shows parts of the connection arrangement according to FIG. 7.

FIG. 9 shows selected parts of the connection arrangement 4 according to FIGS. 7 and 8, including the rotation damper device 100, the second part 100b of the damper device 100 (where the second part 100b is connected to the rear end portion of the first connection element 21), the locking member 105 (that locks the second part 100b to the rear vehicle section 3) and the second connection element 31 that is fixed to the rear vehicle section 3 and surrounds the first connection element 21.

FIG. 9 also indicates that the locking member 105 is provided with clamping elements 106 arranged to fix a flange of the second part 100b of the rotation damper device 100 located between the clamping elements 106. Accordingly, when the clamping elements 106 are engaged and hold the flange of the second part 100b of the rotation damper device 100 in a steady grip, the second part 100b is prevented from rotating in relation to the rear vehicle section 3 (since locking member 105 is fixed to the rear vehicle section 3), from which it follows that the first and second parts 100a, 100b of the damper device 100 will rotate in relation to each other when the front and rear vehicle sections 2, 3 rotate in relation to each other.

Figure 10:
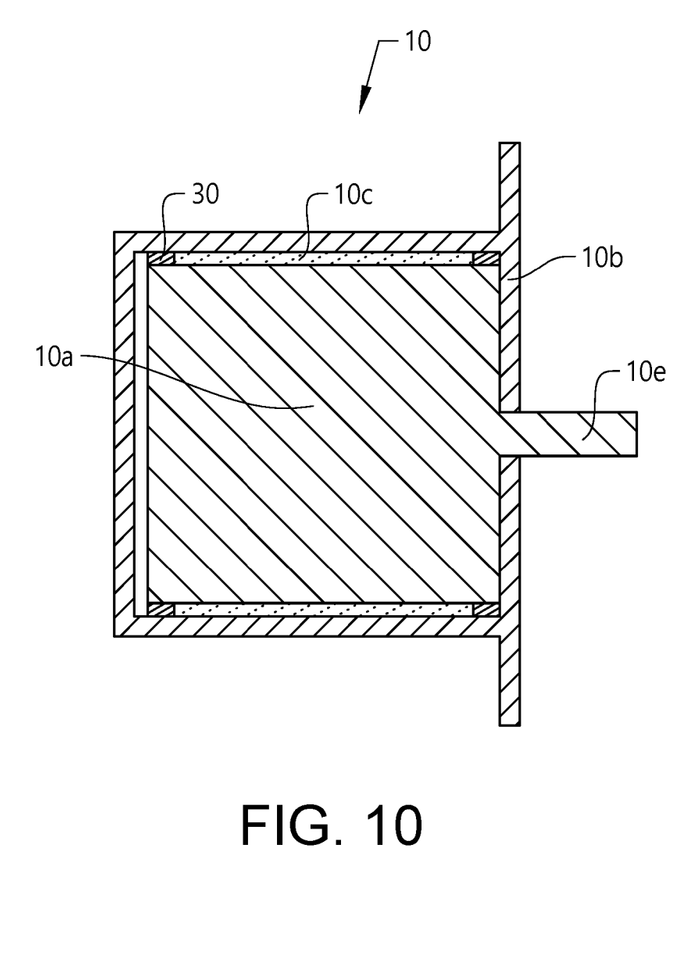
FIG. 10 shows, in a schematic sectional view, the first embodiment of the rotation damper device.
Figure 11:
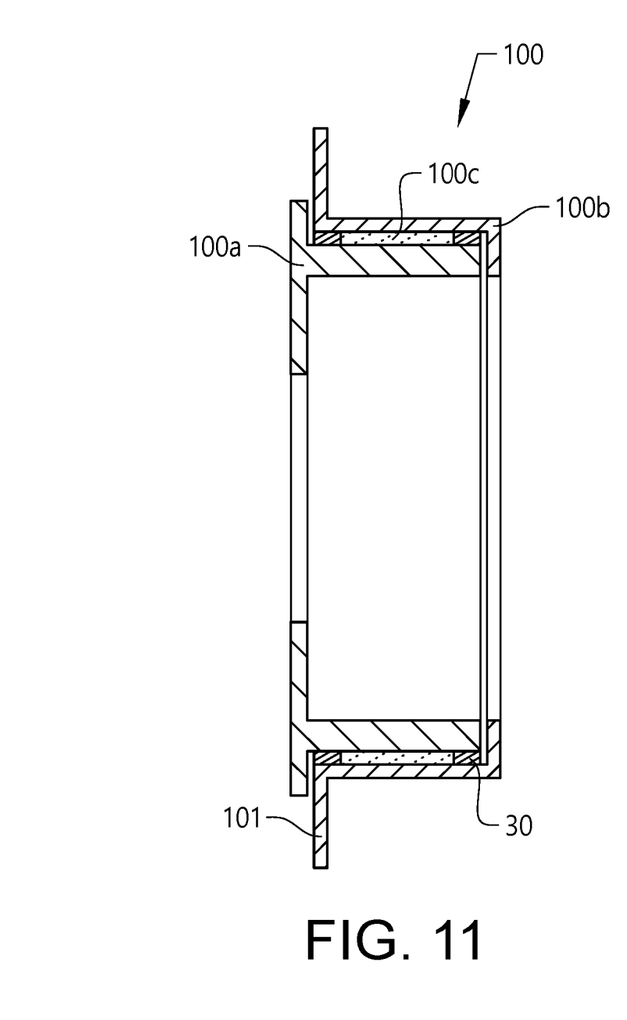
FIG. 11 shows, in a schematic sectional view, the second embodiment of the rotation damper device.

FIGS. 10 and 11 show, in schematic sectional views, the first and second embodiment of the rotation damper devices 10, 100, respectively. It should be noted that these figures show simplified versions of the two damper devices just to show their principal structure and function. As shown in FIGS. 10 and 11, each of the damper devices 10, 100 comprises a first part 10a and, concentrically outside of the first part, a second part 10b, 100b. Bearings 30 are arranged circumferentially between the first and second parts 10a, 10b, 100a, 100b that allow the first and second parts to rotate in relation to each other about a rotation axis that, with reference to the page that shows FIGS. 10-11, extends horizontally and in the same plane as the page (and that is substantially parallel with the longitudinal direction of the vehicle 1). A viscous liquid 10c, 100c in the form of silicon fluid is arranged in the annular space formed between the first and second parts 10a, 10b, 100a, 100b and the bearings 30, which also function as seals to prevent leakage of the viscous liquid 10c, 100c in the axial direction of the rotation damper device 10, 100.

The viscous liquid 10c, 100c has the effect that a relative rotation between the first and second parts 10a, 10b, 100a, 100b is transferred in a dampened manner. For instance, if the inner part 10a, 100a starts rotating while the outer part 10b, 100b is stationary, the rotational movement will be transferred to the outer part but not directly as in a fixed connection but with some delay and with a decreased rate of change (acceleration) of the rotation transferred to the outer part. Also, the acceleration of the rotation of the inner part will be decreased compared to free rotation since force and energy will be at least temporarily absorbed by the viscous liquid.

In the case of the rotation damper device 10 shown in FIG. 10, the first (inner) part 10a is connected, via protruding part 10e, to the front vehicle section 2 via drive belt 11 and first connection element 21 as described above. The second (outer) part 10b forms an outer body that is fixed to the rear vehicle section 2. Accordingly, if the front vehicle section 2 rotates in relation to the rear vehicle section 3, the first and second parts 10a, 10b will rotate in relation to each other and the relative rotation will be transferred in a dampened manner.

In the case of the rotation damper device 100 shown in FIG. 11, the first (inner) part 100a is connected to the front vehicle section 2 directly via first connection element 21 as described above. The second (outer) part 100b forms an outer body that is fixed to the rear vehicle section 2 (via locking member 105 that clamps flange 101 in the example above). Accordingly, if the front vehicle section 2 rotates in relation to the rear vehicle section 3, the first and second parts 100a, 100b will rotate in relation to each other and the relative rotation will be transferred in a dampened manner.

In the case of the rotation damper device 100 shown in FIG. 11, the rotation damper device 100 is arranged concentrically around the longitudinal axis 5 about which the connection arrangement 4 allows the front and rear sections 2, 3 to rotate in relation to each other.

It is to be understood that the present invention is not limited to the embodiments described above and illustrated in the drawings; rather, the skilled person will recognize that many changes and modifications may be made within the scope of the appended claims.

The invention claimed is:

1. An articulated working machine vehicle, such as an articulated hauler, comprising a front section and a rear section pivotally connected via a connection arrangement configured to control a pivot angle between the front and rear sections for steering of the vehicle, the connection arrangement further being configured to allow the front and rear sections to rotate in relation to each other about a longitudinal axis of the vehicle,
characterized in
that the connection arrangement comprises a rotation damper device arranged to transfer dampened relative rotation about the longitudinal axis between the front section and the rear section of the vehicle, wherein the rotation damper device comprises a first part fixed to the vehicle front section and a second part fixed to the vehicle rear section so that the first part rotates in relation to the second part when the front and rear vehicle sections rotate in relation to each other about the longitudinal axis of the vehicle,
and wherein the rotation damper device further comprises a viscous liquid arranged between and in connection with the first and a second part so as to provide for a dampened transfer of rotation between the first and second parts.

2. The articulated vehicle according to claim 1, wherein the first and second parts of the rotation damper device are arranged concentrically and wherein the viscous liquid is arranged radially in between the first and second parts.

3. The articulated vehicle according to claim 1, wherein at least one of the first and second parts of the rotation damper device is connected to its corresponding vehicle section via a driving connection.

4. The articulated vehicle according to claim 1, wherein the connection arrangement comprises a first connection element fixed to the front vehicle section and a second connection element fixed to the rear vehicle section, wherein the first connection element is arranged to be rotatable inside the second connection element and wherein the rotation damper device is arranged in association with a rear end portion of the first connection element.

5. The articulated vehicle according to claim 4, wherein the first part of the rotation damper device is connected to the first connection element.

6. The articulated vehicle according to claim 1, wherein the longitudinal axis, about which the connection arrangement allows the front and rear sections to rotate in relation to each other, extends through the connection arrangement.

7. The articulated vehicle according to claim 1, wherein the rotation damper device is arranged concentrically around the longitudinal axis about which the connection arrangement allows the front and rear sections to rotate in relation to each other.

8. The articulated vehicle according to claim 1, wherein the rotation damper device comprises a locking member arranged to lock the second part of the rotation damper device to the rear vehicle section.

9. The articulated vehicle according to claim 8, wherein the locking member is fixed to the rear vehicle section and wherein the locking member is provided with clamping elements arranged to fix a flange of the second part of the rotation damper device located between the clamping elements.

10. The articulated vehicle according to claim 1, wherein the vehicle front section is provided with an operator/driver cab.

11. The articulated vehicle according to claim 1, wherein the vehicle rear section is provided with a load container.

12. The articulated vehicle according to claim 1, wherein each of the vehicle front and rear sections is provided with at least one pair of wheels.

* * * * *